G. GREGORY.
Carriage-Seat.
No. 51,780.  Patented Dec. 26, 1865.
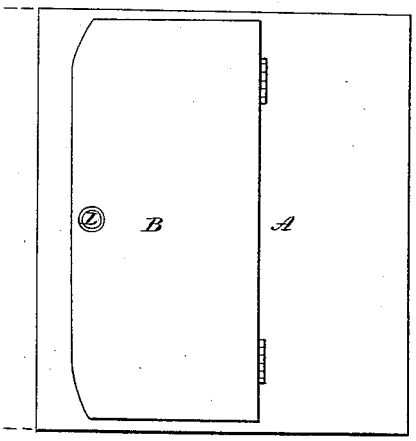
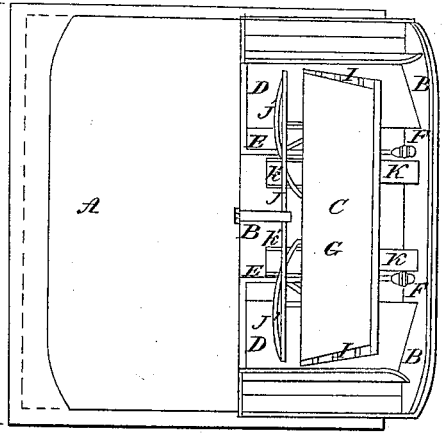
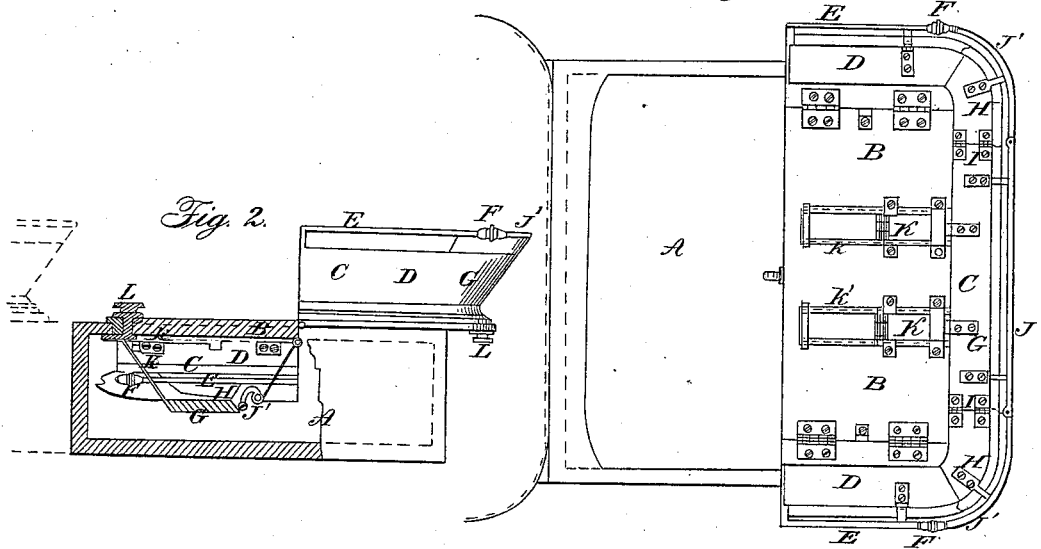
Witnesses:
J. W. Munson
H. C. Mills
Inventor:
George Gregory

UNITED STATES PATENT OFFICE.

GEORGE GREGORY, OF NEW HAVEN, CONNECTICUT, ASSIGNOR TO LAWRENCE, BRADLEY & PARDEE, OF NEW YORK, N. Y.

IMPROVEMENT IN TURN-OUT WAGON-SEATS.

Specification forming part of Letters Patent No. 51,780, dated December 26, 1865.

*To all whom it may concern:*

Be it known that I, GEORGE GREGORY, of New Haven, county of New Haven, and State of Connecticut, have invented a new and useful Improvement in Turn-Out-Seat Wagons; and I do hereby declare that the same is fully described and represented in the following specification and the accompanying drawings, of which—

Figure 1 represents a top view of the box or rear part of a turn-out-seat wagon having my invention applied to it. Fig. 2 is a sectional elevation of the same, representing my improvement as folded and shut down when not in use, as well as raised and ready for use. Fig. 3 is a top view, with the lid turned over and the seat in a folded state, preparatory to unfolding for use; and Fig. 4, a top view of the box with the seat unfolded for use.

The nature of my invention consists in constructing a seat that can be so folded as to occupy a very small space within the box or rear part of a wagon, and when the same is turned out and unfolded will equal in capacity the stationary front seat.

In the drawings, A represents the box or rear part of a turn-out-seat wagon, B the lid, and C the folding seat. The folding seat C has side guards, D D, side guard-rails, E E, and turn-buckles or nuts F F, for connecting the side and rear guard-rails. The rear guard, G, has two flaps, H H, hinged to it, as seen at I I, and directly over the said hinges the rear guard-rail, J, is jointed, for the purpose of enabling the flaps H H and flap-rails J' J' to fold on the main rear guard, G. The main guard G has hinge-slides K K, which slide in grooves K' K', having for its object the support and adjustment of the said rear guard to the side guards, as well as for enabling the whole rear guard to turn or fold on the side guards. The side guards are also hinged to the lid B, and, when released from the rear guard by unscrewing the turn-buckles, are turned over on the lid previous to folding the rear guard thereon, when the whole, being attached to the lower side of the lid, are now turned into the box, as shown in the drawings.

To operate my invention, I simply take hold of the key L, raise and turn the lid backward on the box. I next (by means of the slides) draw the rear guard backward. I then raise the side guards and push the rear guard into position, connecting the guard-rails by means of the turn-buckles, when a seat equal in capacity to, or larger, if desired, than, the stationary front seat is ready for use.

I do not claim attaching a turn-out seat to a wagon, for such is not new, but are inelegant and contracted.

What I do claim, and desire to secure by Letters Patent, is—

The above-described construction and arrangement of a turn-out seat for wagons or other vehicles, substantially as and for the purpose set forth.

In testimony whereof I have hereunto set my signature.

GEORGE GREGORY.

Witnesses:
J. W. MUNSON,
H. C. WELLS.